(12) United States Patent
August et al.

(10) Patent No.: US 8,798,688 B2
(45) Date of Patent: Aug. 5, 2014

(54) SYSTEMS AND METHODS FOR TRANSMITTING DATA USING NEAR FIELD COMMUNICATIONS

(75) Inventors: Clifford August, Langley (CA); Barney Lack-Wai Au, Burnaby (CA); Derek John Pyner, Delta (CA); Henry Hon-Yiu Leung, Coquitlam (CA)

(73) Assignee: Clifford August, Langley, BC ( * ) Notice: Subject to any disclaimer, the term of this patent is extended or adjusted under 35 U.S.C. 154(b) by 108 days.

(21) Appl. No.: 13/354,319

(22) Filed: Jan. 19, 2012

(65) Prior Publication Data

US 2012/0190300 A1 Jul. 26, 2012

Related U.S. Application Data

(60) Provisional application No. 61/434,435, filed on Jan. 20, 2011, provisional application No. 61/434,436, filed on Jan. 20, 2011, provisional application No. 61/434,438, filed on Jan. 20, 2011, provisional application No. 61/434,440, filed on Jan. 20, 2011, provisional application No. 61/484,903, filed on May 11, 2011, provisional application No. 61/485,712, filed on May 13, 2011, provisional application No. 61/550,357, filed on Oct. 21, 2011, provisional application No. 61/550,366, filed on Oct. 21, 2011, provisional application No. 61/550,372, filed on Oct. 21, 2011, provisional application No. 61/554,501, filed on Nov. 2, 2011.

(51) Int. Cl.
*H04M 1/00* (2006.01)
*H04B 1/38* (2006.01)

(52) U.S. Cl.
USPC ........................................ 455/572; 455/41.1

(58) Field of Classification Search
USPC ............ 455/41.1, 41.2, 572, 574, 560, 562.1, 455/575.7, 269
See application file for complete search history.

(56) References Cited

U.S. PATENT DOCUMENTS

| 4,165,575 A | 8/1979 | Neilsen |
| 5,098,633 A | 3/1992 | Hausler |

(Continued)

FOREIGN PATENT DOCUMENTS

| WO | 2008035296 A3 | 3/2008 |
| WO | 2012100104 A1 | 7/2012 |
| WO | 2013059834 A1 | 4/2013 |

OTHER PUBLICATIONS

PCT International Searching Authority, International Search Report, PCT/US2012021933, Apr. 19, 2012, 8 pages.

(Continued)

*Primary Examiner* — Eugene Yun
(74) *Attorney, Agent, or Firm* — Michael R. Schacht; Schacht Law Office, Inc.

(57) ABSTRACT

A data exchange system comprising a device memory module, a device antenna, a device transceiver system comprising a device transceiver module and a device antenna, a power manager, a first switch operable in a first state and a second state, and a power supply for providing power to the device memory module, the device transceiver, and the power manager. When the first switch is in its first state, the device memory module and the device transceiver do not consume sufficient power from the power supply to allow the transfer of data between the device memory module and the host memory. When the first switch is in its second state, the device memory and the device transceiver consume sufficient power from the power supply to allow the transfer of data between the device memory module and the host memory using the host transceiver system.

20 Claims, 10 Drawing Sheets

(56) References Cited

U.S. PATENT DOCUMENTS

| | | |
|---|---|---|
| 5,589,818 A | 12/1996 | Queen |
| 5,793,359 A | 8/1998 | Ushikubo |
| 6,013,949 A | 1/2000 | Tuttle |
| 6,213,879 B1 | 4/2001 | Niizuma et al. |
| 6,285,295 B1 | 9/2001 | Casden |
| 6,424,303 B1 | 7/2002 | Tsai |
| 6,441,723 B1 | 8/2002 | Mansfield, Jr. et al. |
| 6,501,036 B2 | 12/2002 | Rochon et al. |
| 6,650,254 B1 | 11/2003 | Rix |
| 6,807,564 B1 | 10/2004 | Zellner et al. |
| 6,903,662 B2 | 6/2005 | Rix et al. |
| 6,940,974 B2 | 9/2005 | August et al. |
| 6,961,425 B2 | 11/2005 | August |
| 6,978,118 B2 | 12/2005 | Vesikivi et al. |
| 6,983,124 B1 | 1/2006 | Bayley et al. |
| 7,157,651 B2 | 1/2007 | Rix et al. |
| 7,274,909 B2 | 9/2007 | Perttila et al. |
| 7,567,780 B2 | 7/2009 | August et al. |
| 7,570,166 B2 | 8/2009 | Alden et al. |
| 7,760,100 B2 | 7/2010 | August et al. |
| 7,786,893 B2 | 8/2010 | Fuller et al. |
| 7,801,287 B1 | 9/2010 | August |
| 2002/0167500 A1 | 11/2002 | Gelbman |
| 2003/0016136 A1 | 1/2003 | Harvey |
| 2004/0002305 A1 | 1/2004 | Byman-Kivivuori et al. |
| 2004/0113892 A1 | 6/2004 | Mears et al. |
| 2005/0054408 A1 | 3/2005 | Steil et al. |
| 2005/0075169 A1 | 4/2005 | Cheng et al. |
| 2006/0192018 A1 | 8/2006 | Tsai et al. |
| 2006/0258289 A1 | 11/2006 | Dua |
| 2006/0289657 A1 | 12/2006 | Rosenberg |
| 2007/0234215 A1 | 10/2007 | Graham et al. |
| 2008/0195641 A1 | 8/2008 | Tischer et al. |
| 2008/0279138 A1 | 11/2008 | Gonikberg et al. |
| 2009/0322277 A1 | 12/2009 | Cargin, Jr. et al. |
| 2010/0178866 A1 | 7/2010 | Jalkanen |
| 2010/0243742 A1 | 9/2010 | Ullmann et al. |
| 2010/0250818 A1 | 9/2010 | Gill et al. |
| 2011/0063994 A1 | 3/2011 | Nix et al. |
| 2013/0113609 A1 | 5/2013 | August et al. |

OTHER PUBLICATIONS

PCT International Searching Authority, International Search Report, PCT/US2012061397, Mar. 25, 2013, 9 pages.

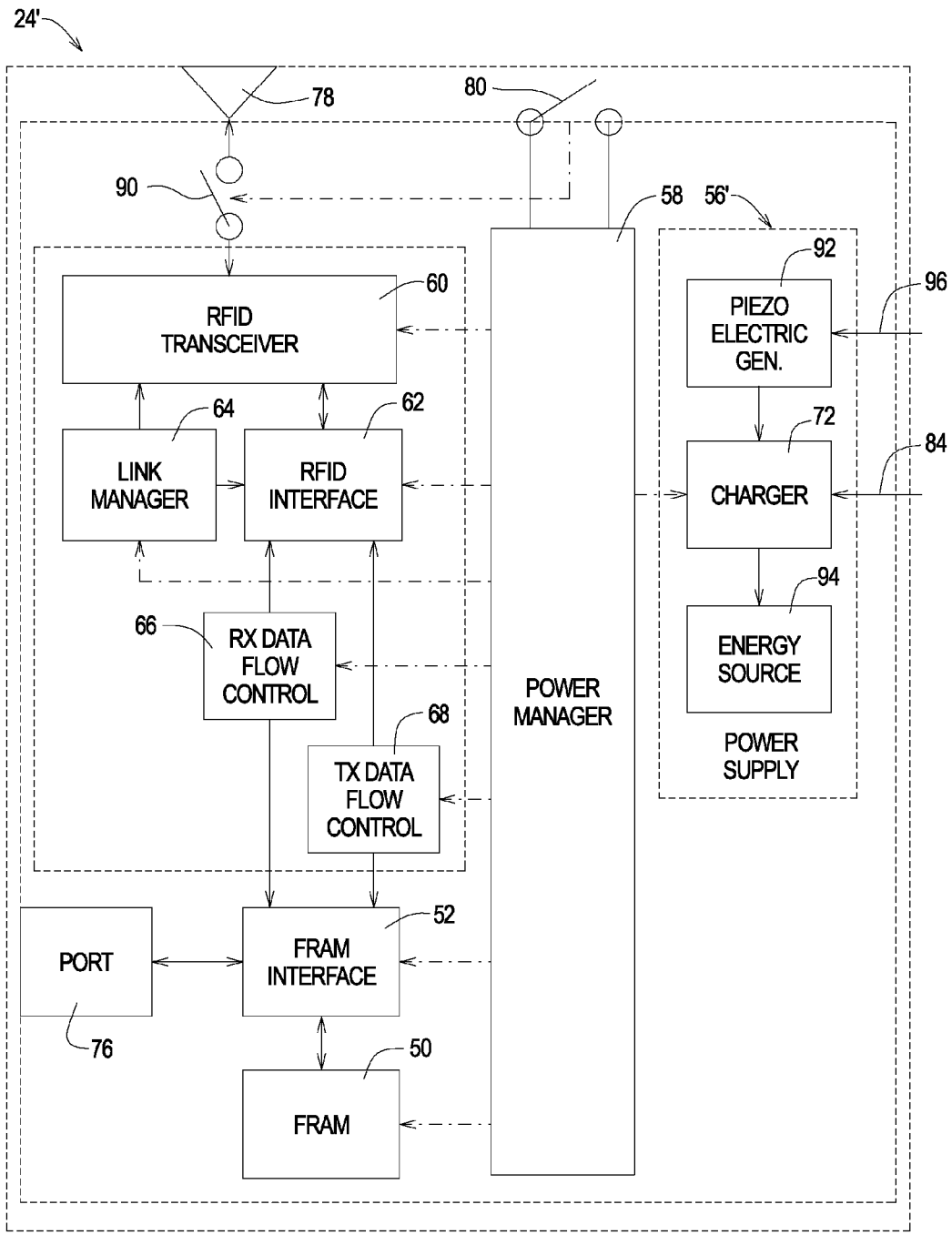

FIG. 7C
FIG. 7D
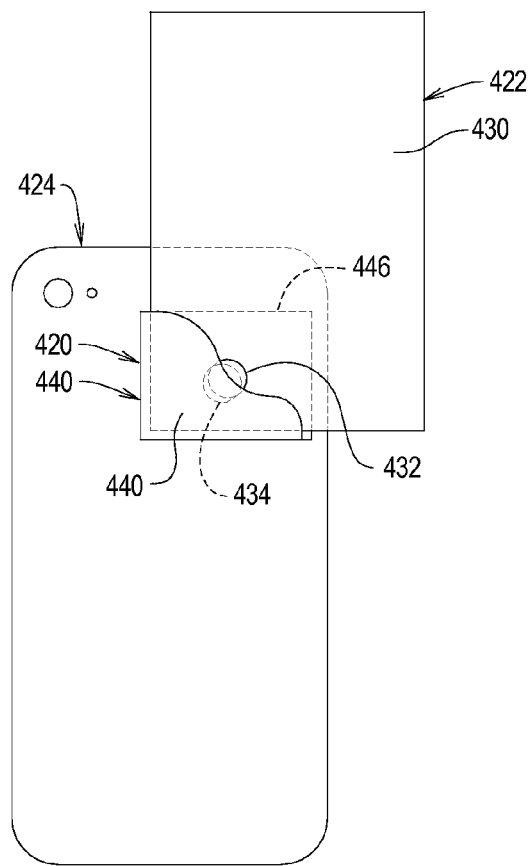
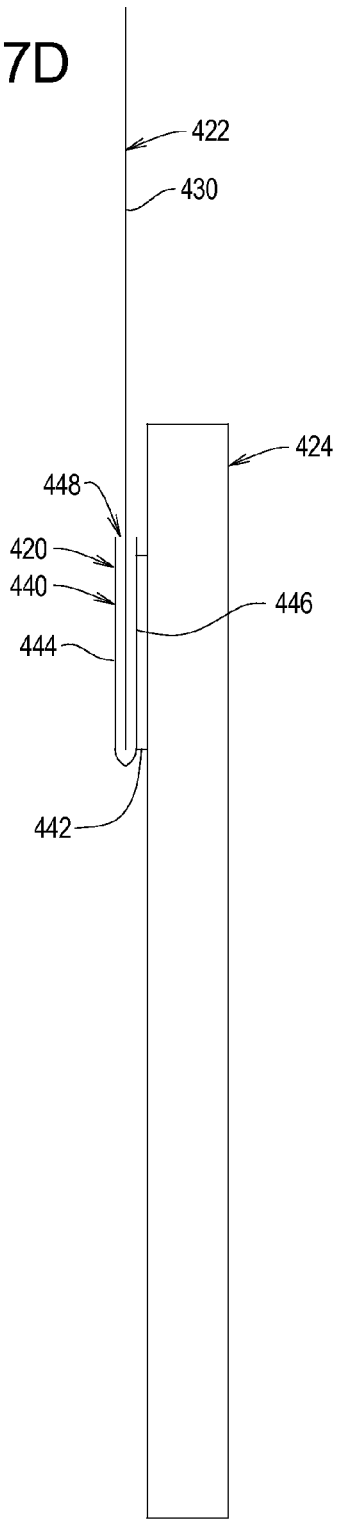

SYSTEMS AND METHODS FOR TRANSMITTING DATA USING NEAR FIELD COMMUNICATIONS

RELATED APPLICATIONS

This application, U.S. patent application Ser. No. 13/354,319 filed Jan. 19, 2012, claims benefit of U.S. Provisional Patent Application Ser. Nos. 61/434,435 filed Jan. 20, 2011, 61/434,436 filed Jan. 20, 2011, 61/434,438 filed Jan. 20, 2011, 61/434,440 filed Jan. 20, 2011, 61/484,903 filed May 11, 2011, 61/485,712 filed May 13, 2011, 61/550,357 filed Oct. 21, 2011, 61/550,366 filed Oct. 21, 2011, 61/550,372 filed Oct. 21, 2011, and 61/554,501 filed Nov. 2, 2011.

The contents of all related applications listed above are incorporated herein by reference.

TECHNICAL FIELD

The present invention relates to near field communications (NFC) systems and, in particular, to NFC systems that store data in a manner that allows the downloading of data to be controlled.

BACKGROUND OF THE INVENTION

NFC systems employ a set of standards that allow communications between two NFC devices by touching them together or bringing them into close contact (e.g., up to 20 cm) with each other. Both of the NFC devices may be powered, or one of the device may be a powered NFC device and the other may be an unpowered NFC device, commonly referred to as a "tag".

Like radio frequency identification (RFID) systems, NFC systems employ magnetic induction between two loop antennas to communicate data. Unlike RFID systems, however, NFC systems allow bi-directional or two-way communications between two compliant NFC devices. Communication between two powered NFC systems consumes far less power than other near range communications systems such as Wi-Fi and Blue Tooth. And unlike Wi-Fi and Blue Tooth systems, NFC devices do not require manual configuration to establish communication. The relatively short range of NFC devices as compared to other communications systems reduces, but does not eliminate, the likelihood that the transmitted data will be intercepted.

The need exists for improved NFC systems and devices that address a range of powering, security, ease of use, and disposal issues associated with NFC systems.

SUMMARY OF THE INVENTION

The present invention may be embodied as a data exchange system for exchanging data with a host device comprising host memory, a host transceiver system, and a host antenna, comprising a device memory module, a device antenna, a device transceiver system, a power manager, a first switch, and a power supply. The device memory module stores data. The device transceiver system comprising a device transceiver module and a device antenna, where the transceiver system allows the transfer of data between the device memory module and the host memory using the device antenna, the host antenna, and the host transceiver system. The first switch is operable in a first state and a second state. The power supply provides power to the device memory module, the device transceiver, and the power manager. When the first switch is in its first state, the device memory module and the device transceiver do not consume sufficient power from the power supply to allow the transfer of data between the device memory module and the host memory. When the first switch is in its second state, the device memory and the device transceiver consume sufficient power from the power supply to allow the transfer of data between the device memory module and the host memory using the host transceiver system.

The present invention may also be embodied as a method of exchanging data with a host device comprising host memory, a host transceiver system, and a host antenna, comprising the following steps. A device memory module for storing data is provided. A device transceiver system comprising a device transceiver module and a device antenna is provided. The device transceiver system allows the transfer of data between the device memory module and the host memory using the device antenna, the host antenna, and the host transceiver system. The device memory module, the device antenna, the device transceiver, a first switch, and a power supply are mounted within a housing. The housing is arranged such that the host antenna and the device antenna are coupled. The first switch is operated in its first state such that the device memory module and the device transceiver do not consume sufficient power from the power supply to allow the transfer of data between the device memory module and the host memory. The first switch is operated in its second state such that the device memory and the device transceiver consume sufficient power from the power supply to allow the transfer of data between the device memory module and the host memory using the host transceiver system.

The present invention may also be embodied as a data exchange system for exchanging data with a host device comprising host memory, a host transceiver system, and a host antenna, comprising a device memory module for storing data, a device antenna, a device transceiver system comprising a device transceiver module and a device antenna, where the transceiver system allows the transfer of data between the device memory module and the host memory using the device antenna, the host antenna, and the host transceiver system, a power manager; a first switch operable in a first state and a second state; a power supply for providing power to the device memory module, the device transceiver, and the power manager; and a housing for containing the device memory module, the device antenna, the device transceiver module, the power manager module, the first switch, and the power supply. When the first switch is in its first state, the power manager operates in a first mode in which the device memory module and the device transceiver do not consume sufficient power from the power supply to allow the transfer of data between the device memory module and the host memory. When the first switch is in its second state, the power manager operates in a second mode in which the device memory and the device transceiver consume sufficient power from the power supply to allow the transfer of data between the device memory module and the host memory using the host transceiver system.

BRIEF DESCRIPTION OF THE DRAWINGS

FIG. 4 is a block diagram of a second example NFC storage device that may be used as part of the data transmission system of FIG. 1;

FIGS. 7C and 7D are rear elevation and side elevation views of the use of the example clip system of FIGS. 7A and 7B to support a support system as depicted in FIGS. 5A-5F;

DETAILED DESCRIPTION

The principles of the present invention may be embodied in many different forms, and a number of example data transmission systems and methods employing the principles of the present invention will be described below.

I. Switched Data Transmission System

Figure 1:
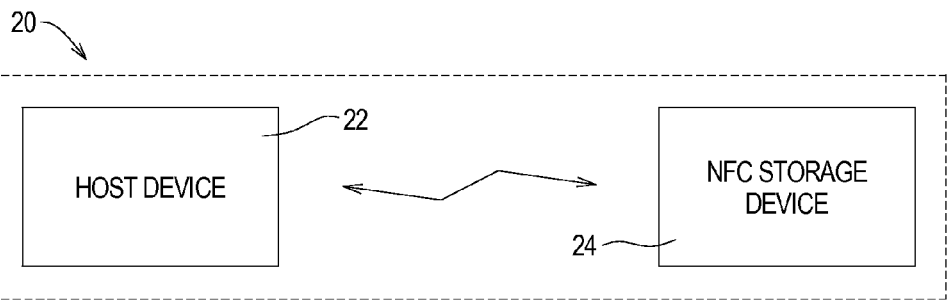
FIG. 1 is a block diagram illustrating an example data transmission system of the present invention.

Referring initially to FIG. 1 of the drawing, depicted at 20 therein is a first example data transmission system constructed in accordance with, and embodying, the principles of the present invention. The first example data transmission system 20 comprises a host device 22 and an NFC storage device 24.

A. Example Host Device

Figure 2:
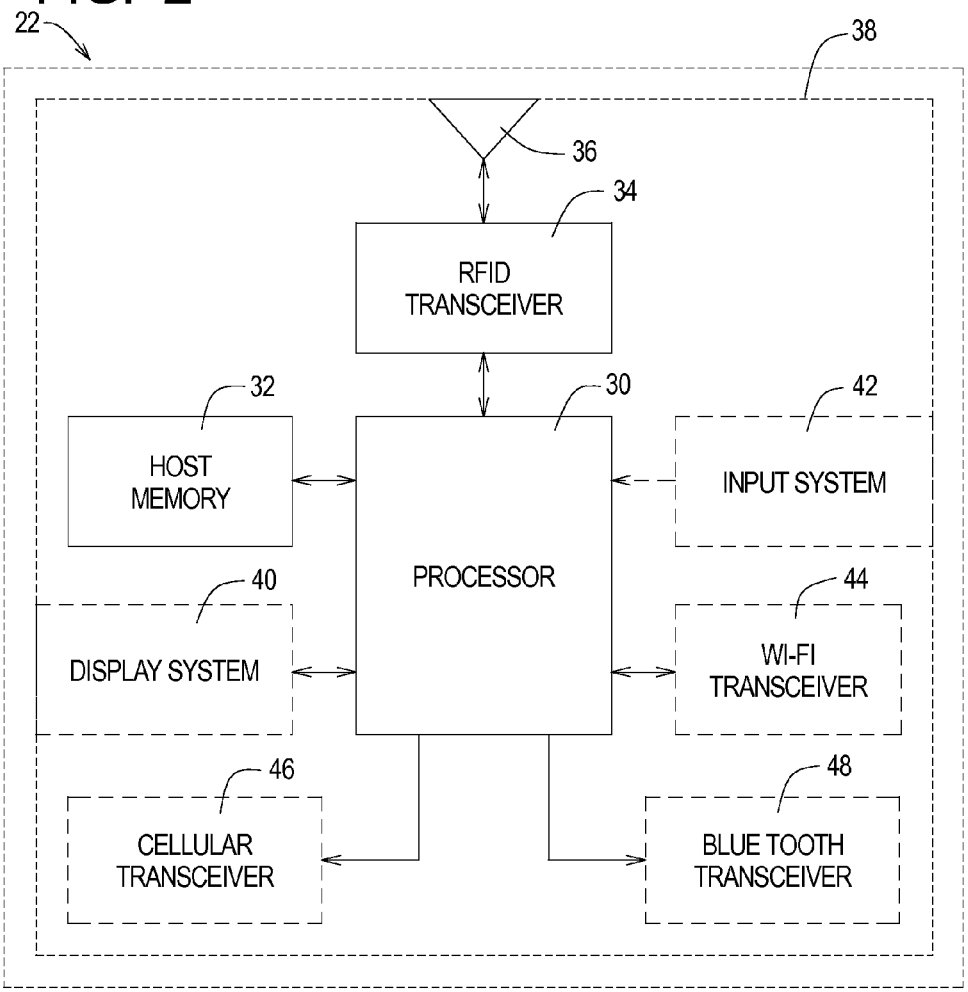
FIG. 2 is a block diagram of an example host device that may be used as part of the data transmission system of FIG. 1.

As shown in FIG. 2 of the drawing, the example host device 22 comprises a processor 30, host memory 32, an RFID transceiver 34, and an antenna 36. The processor 30 is operatively connected to the host memory 32 such that the processor 30 can write data to and read data from the host memory 32. The processor 30 is also operatively connected to the RFID transceiver 34 such that the processor 30 can receive data from and send data to a remote NFC or RFID device using the antenna 36. FIG. 2 further illustrates that the example host device 22 comprises a housing 38.

The example host device 22 will typically be a cellular telephone, tablet computer, laptop computer, or other device with additional components such as a display system 40, an input system 42, a Wi-Fi transceiver 44, a cellular transceiver 46, and/or a blue tooth transceiver 48. In many host devices, the display system 40 and input system 42 are at least partly integrated in the form of a touch screen display.

As is conventional, the host device 22 comprises a power system (not shown) with a charger and/or battery or other power storage device that allows the example host device 22 to function as a powered NFC device.

B. First Example NFC Storage Device

Figure 3:
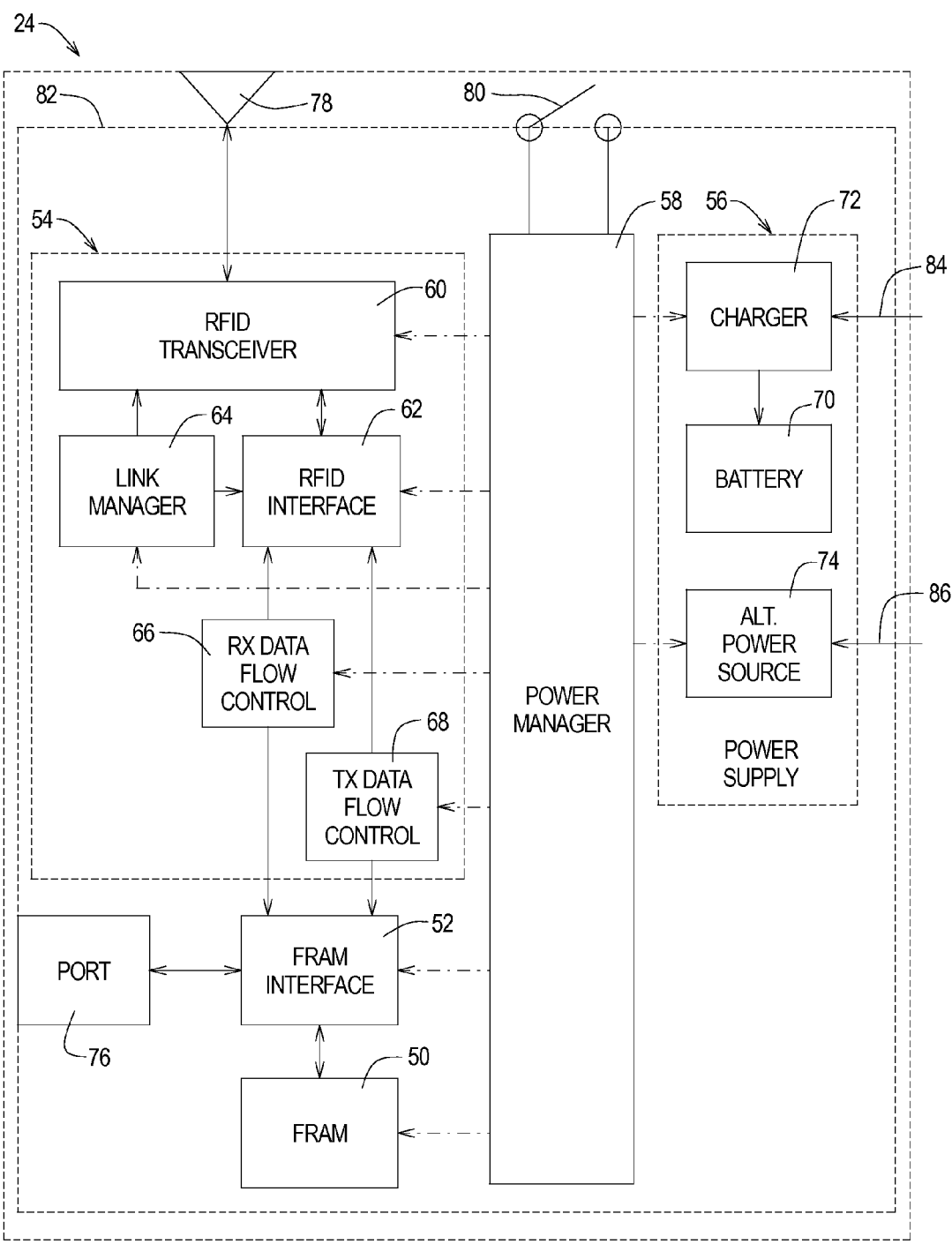
FIG. 3 is a block diagram of a first example NFC storage device that may be used as part of the data transmission system of FIG. 1.

Referring now to FIG. 3 of the drawing, the example NFC storage device 24 is depicted in further detail. The example NFC storage device 24 comprises a flash random access memory component (FRAM) 50 capable of storing data, a FRAM interface component 52, a transceiver system 54, a power supply system 56, and a power manager 58. The example transceiver system 54 comprises an RFID transceiver 60, a RFID interface 62, a link manager 64, a receive data flow controller 66, and a transmit data flow controller 68. The example power supply 56 comprises a battery 70 and, optionally, a charger 72 and an alternative power source 74. As is conventional, the battery 70 is operatively connected to supply power to all of the components of the NFC storage device 24 that require power for proper operation in at least one mode. The example NFC storage device 24 further comprises a programming port 76 to allow data to be written directly to and read directly from the FRAM 50. The RFID transceiver 60 is connected to an antenna 78.

The example power manager 58 is operatively connected to a switch 80. The example power manager 58 is programmed to allow the NFC storage device 24 to operate in a low power mode and in an active mode. The example switch 80 takes the form of a normally open single pole/single throw button operated electrical switch, but other switch configurations and combinations may be used that perform a similar function.

When the switch 80 is open, the power manager 58 causes the NFC storage device 24 to operate in the low power mode. In the low power mode, the power manager 58 deactivates the actively powered components of the NFC storage device 24. The actively powered components of the NFC storage device 24 include the FRAM 50, the FRAM interface component 52, the RFID transceiver 60, the RFID interface 62, the link manager 64, the receive data flow controller 66, and the transmit data flow controller 68. The NFC storage device 24 cannot transmit or receive data when in the lower power mode.

When the switch 80 is closed, the power manager 58 causes the NFC storage device 24 to operate in the active mode. In the active mode, the power manager 58 actives the power consuming components of the NFC storage device 24 such that the NFC storage device 24 allows data to be written to and read from the FRAM 50 using the transceiver system 54. FIG. 3 further illustrates that the NFC storage device 24 comprises a housing 82 and that the switch 80 is accessible from outside of the housing 82.

The power manager 58 further controls the charging of the battery 70 using the charger 72. An arrow 84 illustrates a power signal that allows the charger 72 to charge the battery 70. The alternate power source 74 supplies power to allow operation of the NFC storage device 24 in the active mode when the battery 70 is discharged or inoperative for any other reason. An arrow 86 illustrates a power input such as an electric power input, mechanical power input (e.g., vibrational), and/or chemical power input (e.g., hydrogen) from which an electrical power signal suitable for powering the NFC storage device 24 in the active mode can be generated or derived.

Given the foregoing general discussion of the example NFC storage device 24, the details of the components of that device 24 will now be described in further detail.

The example RFID transceiver 60 converts the baseband signal from the RFID interface 62 to the RF signal for transmission to the host device 22. The transceiver 60 also receives the RF signal from the host device 22 and converts it to baseband signal, then transfers the baseband signal to the RFID interface 62.

Located between the RFID transceiver 60 and the antenna 78 is impedance-matching and duplexing circuitry (not shown) that allows the transceiver and the antenna to interoperate. The antenna 78 is an external coil antenna designed to respond only to magnetic field induction at a frequency of 14.56 MHz, which is the standard operating frequency of RFID. The duplexing circuitry allows the receiver and transmitter portions of the RFID transceiver 60 to use the same antenna 78.

When the antenna 78 captures the RF power signal from the host device 22, the receiver portion of the RFID transceiver 60 is converted to baseband signal and passed to the RFID interface 62 for processing. If the received baseband signal is recognized as a request to transfer stored data, then the stored data is processed into a baseband signal. That baseband signal is then transferred to the transmitter portion of the RFID transceiver 60, where the baseband signal is converted to RF power signal.

The RFID interface 62 consists of a receive digital portion which takes the received baseband signal and filters it through decoders and framing circuits (not shown). Application-specific signals such as Start-of-Frame, End-of-Frame, parity bits and CRC bytes are removed from the baseband signal and transferred to other peripherals in the chipset. The remaining baseband "payload" signal is transferred to a 128-byte FIFO register, then transferred to an internal microcontroller (not shown) for further processing.

The RFID interface 62 further comprises a transmit digital portion which takes the baseband "payload" signal from the microcontroller (stored data file in FRAM) and transfers it through a 128-byte FIFO register. Encoders and framing circuits then add the Start-of-Frame, End-of-Frame, parity bits and CRC bytes to the baseband "payload" signal, which is then sent to the RFID transceiver 60 peripheral.

The link manager 64 controls performance parameters as defined by the NFC protocol. These parameters include modulation and coding, data transfer rate, and RF transmit power. The example link manager 64 configures the RFID interface 62 and RFID transceiver 60 to operate in Peer-to-Peer mode.

The receive data flow controller 66 operates in conjunction with the bit-collision detection in the framing circuitry of the RFID interface 62. When a bit collision is detected in the received baseband signal, an interrupt request is sent to the internal microcontroller. The microcontroller then clears the payload data it just received from its registers.

The transmit data flow controller 68 prevents the overflow of the FIFO register in the RFID interface 62. In every payload data to be transmitted from the microcontroller to the RFID interface 62, two bytes of data are attached to the beginning of the transmission, indicating the length of the payload data. If the data length is longer than the allowable size of the FIFO register, an interrupt request is sent to the microcontroller. The microcontroller halts the next data packet until the interrupt is cleared. This allows the remaining bits of the current data packet to be transferred through the FIFO register.

The FRAM interface component 52 receives incoming payload data. When the FRAM interface component 52 determines that the incoming data is from a valid host device 22, it enables the FRAM 50 and transmits the data file stored within the FRAM chipset.

The FRAM interface component 52 also monitors interrupt requests. If an interrupt request is detected, the payload data in its registers is cleared (in receive mode) or the transmission of the next data packet from the FRAM chipset (in transmit mode) is halted.

Data file to be stored within the FRAM chipset is transferred from the programming port 76. For this purpose, the FRAM interface component 52 re-directs data packets from the programming port 76 to the FRAM chipset.

The example FRAM 50 is a non-volatile, flash memory device or chipset in which a data file may be stored. Stored data contents are not erased when electrical power is removed from the NFC storage device 24. Current examples of the FRAM 50 typically contain files from 1 to 2 Mbit in size.

Any memory module or circuit capable of storing data for transmission as described herein may be used in place of the FRAM 50 described herein. For example, while the FRAM is a non-volatile memory device that does not require power to retain data, a volatile memory device that does require power to retain data may be used as the memory module. Of course, the additional power requirements of a volatile memory device will increase the demands on the power supply 56.

As generally discussed above, the data or data file to be stored within the FRAM chipset is transferred from the programming port 76. For this purpose, the FRAM interface component 52 re-directs data packets from the programming port 76 to the FRAM chipset.

The power manager 58 constantly monitors the external DC power switch 80. When monitoring the external switch 80 (i.e., switch open), the power manager 58 operates in the low-power mode and draws minimal amount of current from the battery 70. When the switch 80 is closed, the power manager 58 then operates in the active mode, energizing the entire NFC storage device 24. When the switch is open, the entire NFC storage device 24 is de-energized and the power manager 58 reverts to operating in low-power mode.

The charger 72 transfers energy to the battery 70. The amount of charging current is regulated by the power manager 58 peripheral within the MSP430F2370.

The example battery 70 is a Li-ion battery cell capable of supplying DC power to the entire NFC storage device 24.

If a Li-ion battery is discharged, inoperative, or otherwise not available, an AC-to-DC power adaptor or other alternative energy source can be used to operate the NFC storage device 24.

Many components of the example NFC storage device 24 may be implemented with currently available chip sets. For example, the FRAM interface component 52, the power manager 58, and the programming port 76 can be embodied as a Texas Instruments MSP430F2370 chip set. The RFID transceiver 60, the RFID interface 62, the link manager 64, the receive data flow controller 66, and the transmit data flow controller 68 can be embodied as a Texas Instruments TRF7970A chip set. Chips sets with similar functionality from other manufactures such as NPX may be used instead of the example Texas Instruments chip sets described herein.

C. Second Example NFC Storage Device

Depicted in FIG. 4 of the drawing is a second example NFC storage device 24' constructed in accordance with, and embodying, one form of the present invention. The second example NFC storage device 24' is or may be constructed in substantially the same manner as the first example NFC storage device 24 and will be described herein only to the extent that the second device 24' differs from the first device 24.

The second device 24' may be referred to as a switched antenna NFC storage device because a switch 90 is arranged between the RFID transceiver 60 and the antenna 78. The example switch 90 is operated by pressing the button forming a part of the example switch 80. When the switch 80 is open, the power manager 58 causes the NFC storage device 24' to operate in a disconnected mode. In the disconnected mode, the antenna is completely disconnected from the RFID transceiver 60, preventing reading of the data stored in the FRAM 50 under any circumstance. The NFC storage device 24' cannot transmit or receive data when in the disconnected mode. When the switch 90 is closed, the antenna 76 is connected to the RFID transceiver 60, allowing data to be written to and read from the FRAM 50.

In the NFC storage device 24', the example switch 80 takes the form of a normally open double pole/single throw button operated electrical switch that opens and closes the switches 80 and 90 together with the pressing of a single button. Again, other switch configurations and combinations may be used that perform a similar function.

FIG. 4 further illustrates that a power supply system 56' of the second example NFC storage device 24' comprises, in addition to the charger 72, a piezo electric transducer 92 and an energy storage device 94. The transducer 92 converts mechanical movement indicated by arrow 96 into an electrical signal and thus forms an electrical generator. The charger 72 converts the electrical signal from the transducer 92 into a power signal appropriate for storage by the energy storage device 94 and later use by the NFC storage device 24'. The energy storage device 94 may be a battery, capacitor, or any other device capable of storing energy that can be used by the device 24'.

II. Support Systems and Methods

FIGS. 5A-5F illustrate a number of example support systems that may be used to support NFC storage devices for shipment, storage, distribution, retail display, and use.

A support system of the present invention may be designed to accommodate an NFC storage system such as the example NFC storage systems 24 and 24' described above. Alternatively, a data storage system such as that disclosed in any one of U.S. Pat. Nos. 6,961,425, 7,567,780, 7,760,100, and/or 7,801,871 may be supported by any of the support systems described herein, and the contents of these patents are incorporated herein by reference. More generally, the support systems and methods of the present invention may be used to support any switched or unswitched, passive or active NFC or RFID chip or tag.

In general, a support system of the present invention comprises an NFC storage device supported by a substrate. The substrate may simply be a card stock, paperboard, or plastic sheet having no function other than to facilitate handling of the NFC storage device. Alternatively, the substrate may be provide with one or more additional or supplemental features that may be used to extend and in conjunction with the data storage capabilities of the NFC storage device.

A number of example support systems and included substrates will be described below, but additional features and combinations of features may be used to implement the principles of the present invention in addition to the specific examples described below.

Figure 5A:
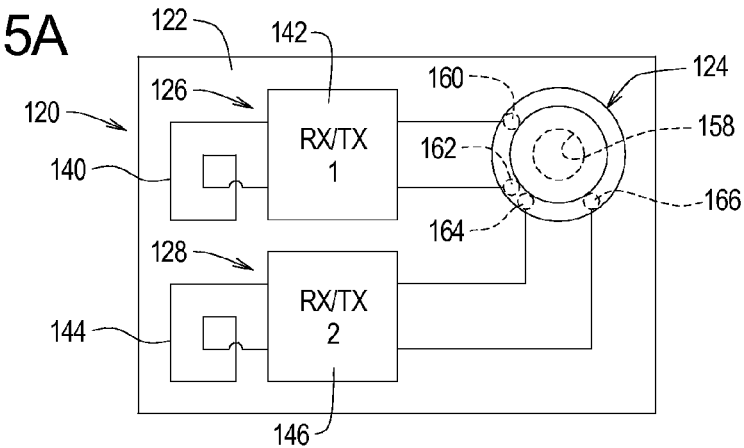
FIGS. 5A-F illustrate first, second, third, fourth, and fifth example support systems for supporting a NFC storage device.
Figure 5B:
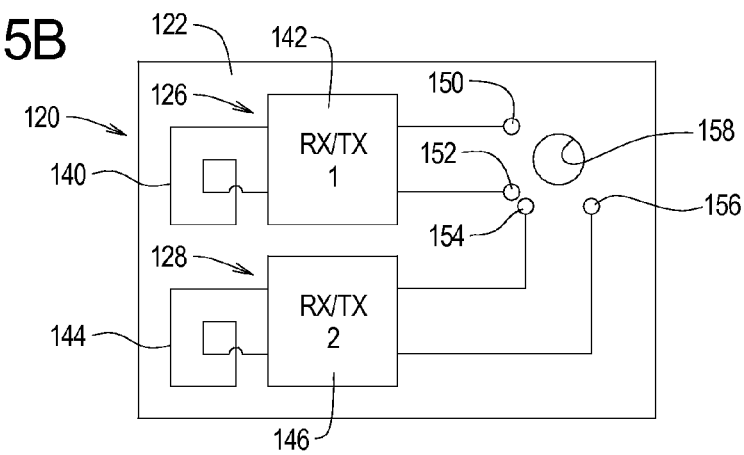

In particular, FIGS. 5A and 5B depict a first example support system 120 comprising a substrate 122 and a NFC storage device 124. As shown in FIG. 5B, the example substrate 122 comprises first and second substrate transceiver systems 126 and 128.

The example NFC storage device 124 comprises, at a minimum, a memory component such as the FRAM component 50 and an interface component for the memory component such as the FRAM interface component 52 described above. Optionally, the example NFC storage device 124 further may comprise an onboard transceiver system such as the transceiver system 54 described above.

The first example substrate transceiver system 126 comprises a first antenna 140 and a first transceiver 142. The second example substrate transceiver system 128 comprises a second antenna 144 and a second transceiver 146. The first and second substrate transceiver systems 126 and 128 are designed to operate at different frequencies.

The first and second substrate transceiver systems 126 and 128 are connected to a first pair of substrate contacts 150 and 152 and a second pair of substrate contacts 154 and 156, respectively. The substrate contacts 150-156 are arranged adjacent to a substrate opening 158 formed in the substrate 122. The NFC storage device 124 engages the substrate opening 158 to detachably attach the storage device 124 to the substrate 122 and thus form the support system 120. An attachment system as described in U.S. Pat. No. 7,760,100 may be used to attach the NFC storage device 124 to the substrate 122.

The example NFC storage device 124 is provided with onboard contacts 160, 162, 164, and 166 that are arranged to electrically engage the substrate contacts 150-156 to allow signals to be transmitted between the substrate transceiver systems 126 and 128 and the memory component of the NFC storage device 124 as generally described above. Additional contacts may be provided on the substrate 122 and the device 124 to allow power to be transferred between the substrate 122 and the device 124. As an alternative to the use of two pairs of two (four total) of onboard contacts as shown in FIG. 5A, the NFC storage device 124 may be provided with a single pair of onboard contacts, in which case the NFC storage device 124 is rotated to align the single pair of onboard contacts with a selected one of the pairs of substrate contacts 150 and 152 or 154 and 156.

The substrate 122 thus provides optional or additional transceiver systems for use by the NFC storage device 124 to allow that device 124 to transfer data with host devices having differing communications frequencies and/or standards. These substrate transceiver systems 126 and 128 may take the place of the transceiver system 54 of the NFC storage devices 24 and 24' as described above or may be used in addition to an onboard transceiver system such as the example transceiver system 54 described above. While two substrate transceiver systems 126 and 128 are described in the example support system 120, fewer or more substrate transceiver systems may be employed.

Figure 5C:
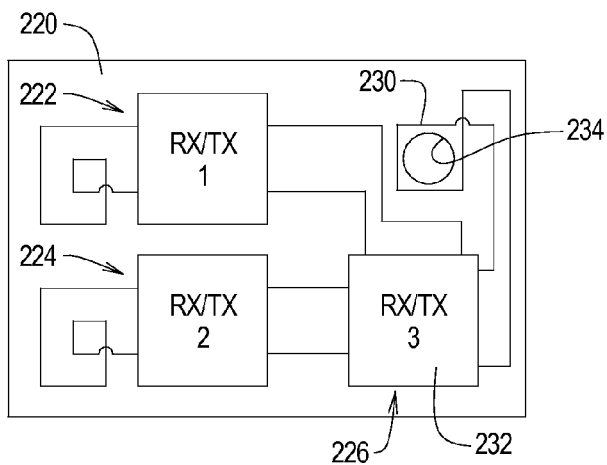

FIG. 5C depicts a second example substrate 220 in which the NFC storage device 124 comprises an onboard transceiver system such as the transceiver system 54. In this case, the second example substrate may be used in place of the first example substrate 122. The second example substrate 220 comprises first, second, and third substrate transceiver systems 222, 224, and 226. The first and second substrate transceiver systems 222 and 224 may be constructed in the same manner as the first and second substrate transceiver systems 126 and 128 described above and thus operate using a different frequency/standard than the onboard transceiver system.

The second example substrate 220 further comprises the third substrate transceiver system 226 to allow wireless communication between the either of the substrate transceiver systems 222 and 224 and the onboard transceiver system on the NFC storage device 124. In particular, the third substrate transceiver system 226 comprises a third substrate antenna 230 and a third substrate transceiver 232. The second example substrate 220 defines a substrate opening 234, and the third substrate antenna 230 is adjacent to and/or extends around the substrate opening 234. When the NFC storage device 124 is attached to the second example substrate 220, an onboard antenna such as the antenna 36 described above is coupled to the third substrate antenna 230.

The use of the third substrate transceiver system 226 obviates the need for substrate contacts and/or onboard contacts to allow data to be transmitted between a memory component on the NFC storage device 124, such as the FRAM 50, and the first and second substrate transceiver systems 222 and 224.

Figure 5D:
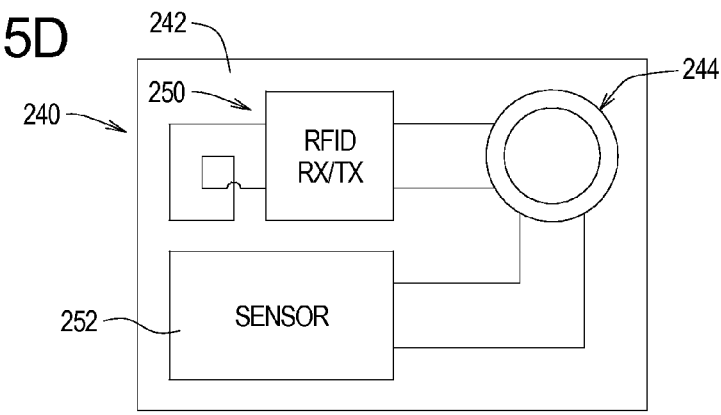

FIG. 5D illustrates a second example support system 240 comprising a third example substrate 242 and an NFC storage device 244 like the NFC storage device 124 described above. The third example substrate 242 comprises a substrate transceiver system 250 and a substrate sensor 252. The substrate transceiver system 250 is or may be like either of the substrate transceiver systems 126 and 128 described above. The substrate sensor 252 may be or include any one or more of a number of sensors for detecting and/or quantifying parameters in the area surrounding the substrate 242 such as air or body temperature, humidity, heart rate, blood sugar levels, radiation, and the like. The sensor 252 may be used to extend the capabilities of the NFC storage device 244, allowing this device 244 to store environmental data for future downloading as generally described above.

Figure 5E:
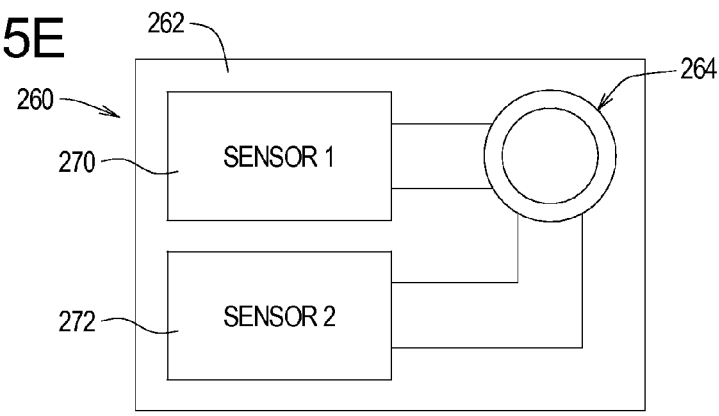

FIG. 5E illustrates a third example support system 260 comprising a fourth example substrate 262 and an NFC storage device 264 like the NFC storage device 124 described above. The third example substrate 262 comprises a first substrate sensor 270 and a second substrate sensor 272. Again, the substrate sensors 270 and 272 may be or include any one or more of a number of sensors for detecting and/or quantifying parameters in the area surrounding the substrate 262 such as air or body temperature, humidity, heart rate, blood sugar levels, radiation, and the like. The sensors 270 and 272 may be used to extend the capabilities of the NFC storage device 264, allowing this device 264 to store environmental data for future downloading as generally described above.

Figure 5F:
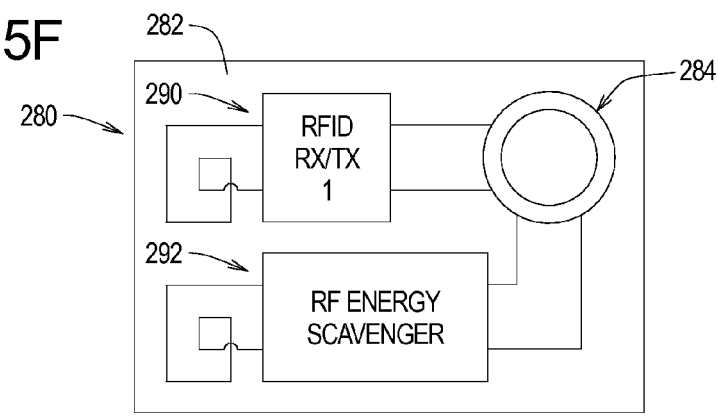

FIG. 5F illustrates a fifth example support system 280 comprising a fourth example substrate 282 and an NFC storage device 284 like the NFC storage device 124 described above. The fifth example substrate 282 comprises a substrate transceiver system 290 and a secondary energy source 292. The substrate transceiver system 290 is or may be like either of the substrate transceiver systems 126 and 128 described above. The example secondary energy source 292 is an RF energy scavenger system that stores RF energy present in many locations. The RF energy stored by the example secondary energy source 292 may be provided to the NFC storage device 284. The secondary energy source 292 may also take the form of a battery or a piezo electric transducer capable of generating and/or storing energy for use by the NFC storage device 284.

III. Recycling Methods

Turning now to FIGS. 6A-6F of the drawing, an example recycling method of the present invention is depicted. As described above, an NFC storage device constructed in accordance with the principles of the present invention may be distributed in conjunction with a substrate. Either or both of the NFC storage device and the substrate may be collected and reused.

Again, a data storage system such as that disclosed in any one of U.S. Pat. Nos. 6,961,425, 7,567,780, 7,760,100, and/or 7,801,871 may be recycled by any of the recycling systems described herein, and the contents of these patents are incorporated herein by reference. More generally, the recycling systems and methods of the present invention may be used to support any switched or unswitched, passive or active NFC or RFID chip or tag.

Figure 6A:
FIGS. 6A-6F illustrate an example method of recycling a support system such as those depicted in FIGS. 5A-5F.

FIG. 6A illustrates an example support system 320 to be recycled. The example support system 320 comprises a substrate 322 and an NFC storage device 324. In the first step, the data stored on the example NFC storage device 324 is erased by, for example, exposing the NFC storage device 324 (and thus any included memory component such as an FRAM component) to a magnetic field strong enough to corrupt the data stored by the NFC storage device 324. Alternatively, an erase signal may be communicated to the NFC storage device either electrically or using the onboard transceiver.

Figure 6B:
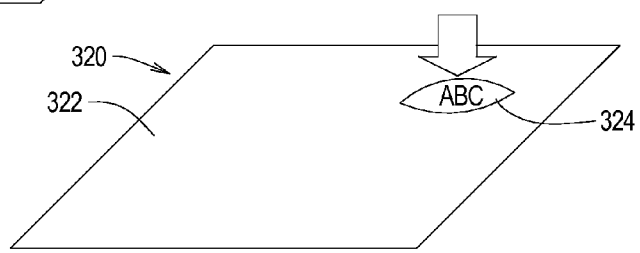
Figure 6C:
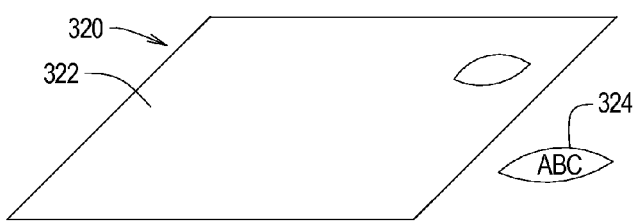
Figure 6D:
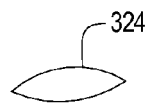
Figure 6E:
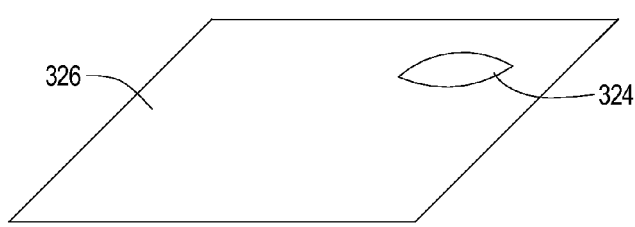
Figure 6F:
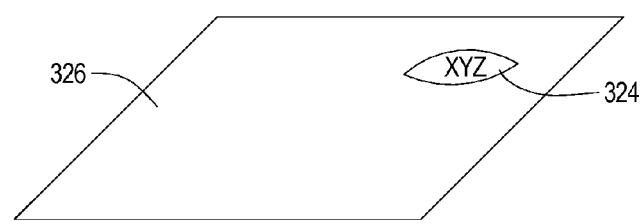
Figure 7A:
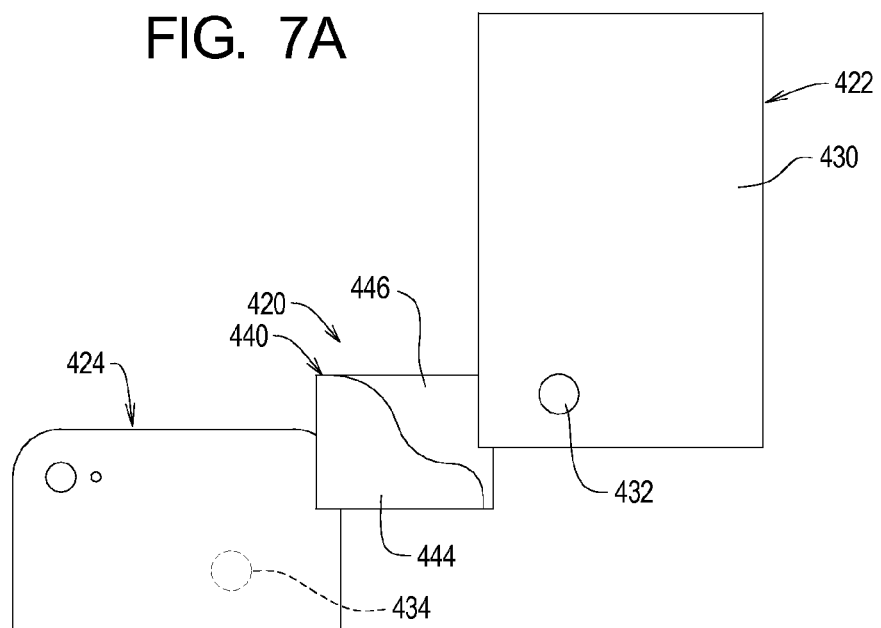
FIG. 7A is an exploded view of a first example clip system of the present invention.
Figure 7B:
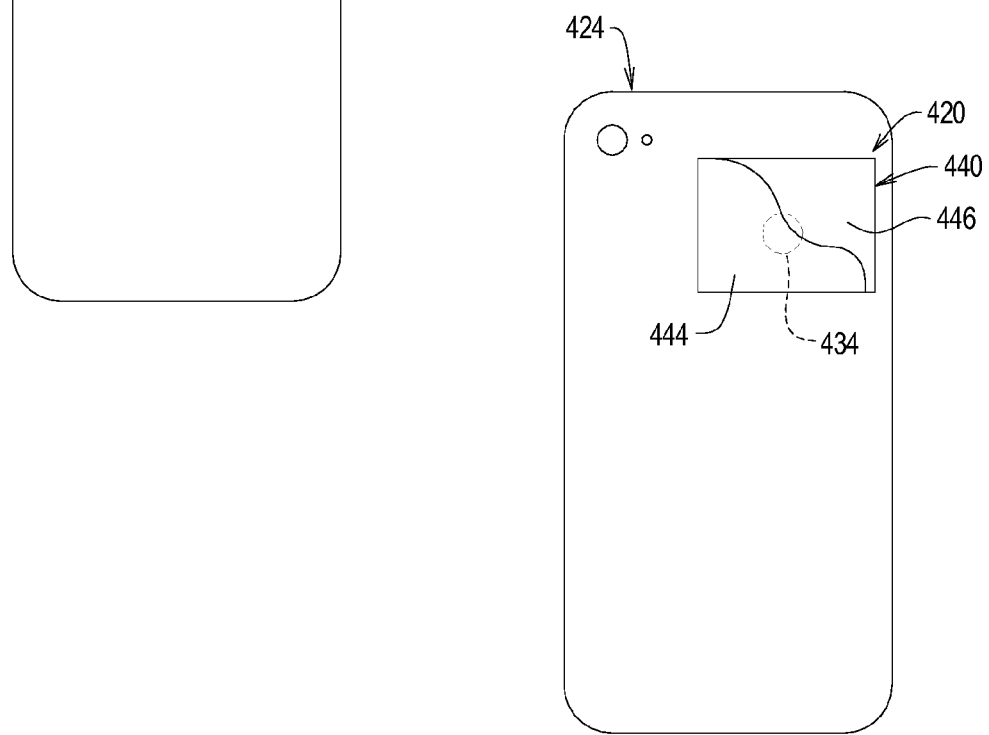
FIG. 7B is a rear elevation view depicting the first example clip system of FIG. 7A installed on a host device.

After the data on the NFC storage device 324 has been rendered unreadable, the NFC storage device 324 is removed from the substrate 322 as shown in FIGS. 6B and 6C. At this point, the substrate 322 and NFC storage device 324 may be processed separately for recycling or reuse. As shown in FIG. 6D, indicia on the NFC storage device 324 may be removed; a similar process may be performed on the substrate 322 as necessary. The NFC storage device 324 is then remounted on another substrate 326 as shown in FIG. 6E. New indicia may then be printed onto the NFC storage device 324 as shown in FIG. 6F. The NFC storage device 324 may be re-programmed with new data, typically any time after the indicia have been removed and/or reapplied.

IV. Clip Systems and Methods

Depending on the amount of data stored on the NFC storage device and the data transfer rates, the total time required to transfer data between a particular NFC storage device and a particular host device may last from several seconds to several minutes. It may be inconvenient for the user to hold the NFC storage device in a location appropriate for the antennas to couple as necessary to transfer data.

Again, a data storage system such as that disclosed in any one of U.S. Pat. Nos. 6,961,425, 7,567,780, 7,760,100, and/or 7,801,871 may be supported relative to a host device by any of the clip systems or methods described herein, and the contents of these patents are incorporated herein by reference. More generally, the clip systems and methods of the present invention may be used to support any switched or unswitched, passive or active NFC or RFID chip or tag.

FIGS. 7A-7D illustrate a first example clip system 420 for supporting an NFC support system 422 relative to a host device 424 to facilitate the transfer of data in a convenient manner. The example NFC support system 422 comprises a substrate 430 and a NFC storage device 432 and may be, for example, formed by any of the example support systems 120, 220, 240, 260, and 280 described above. The example host device 424 is a smart phone comprising an NFC antenna 434.

As perhaps best shown in FIG. 7D, the example clip system 420 comprises a clip housing 440 and an adhesive layer 442. The clip housing 440 comprises a front wall 444 and a rear wall 446; the front wall 444 and rear wall 446 define a clip chamber 448 sized and dimensioned to engage a portion of the substrate 430 as will be described in further detail below. The adhesive layer 442 adhesively engages both the rear wall 446 of the clip housing and the host device 424 such that the clip housing 440 substantially overlays the NFC antenna 434.

As generally described above, the example clip chamber 448 is sized and dimensioned to engage the corner of the substrate 430 such that the NFC storage device 432 is arranged substantially adjacent to the NFC antenna 434 of the host device 424. The onboard antenna of the NFC storage device 432 will thus be held, without interaction with by the user, adjacent to the NFC antenna 434 of the host device 424. The user may thus use the host device 424 with two hands in a normal manner while data is transferred between the host device 424 and the NFC storage device 432.

Accordingly, when securing the clip system 420 to the host device 424, the user should first identify a location of the NFC antenna 434. Further, the user will also typically orient the clip system 420 such that the clip chamber 448 is arranged such that the substrate 430 is unlikely to fall out of the clip chamber 448 during transfer of data between the NFC storage device 432 and the host device 424 when the host device 424 is held and used in a normal spatial orientation. Further, the location of the NFC storage device 432 on the substrate 430 should be taken into account when determining the size and dimensions of the clip system 420 and the location and orientation of the clip system 420 with respect to the host device 424.

Figure 8A:
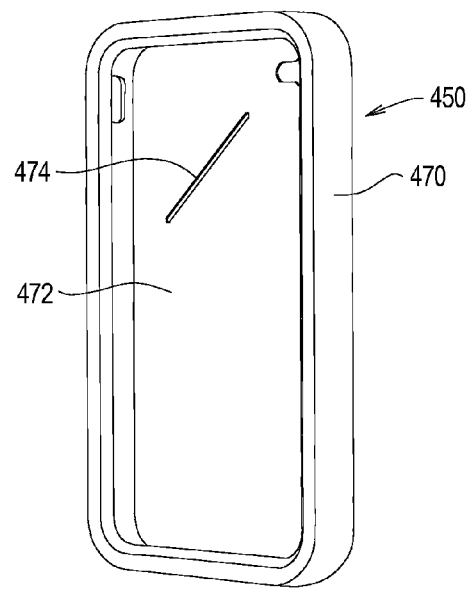
FIG. 8A is a front perspective view of a first example case system of the present invention.
Figure 8B:
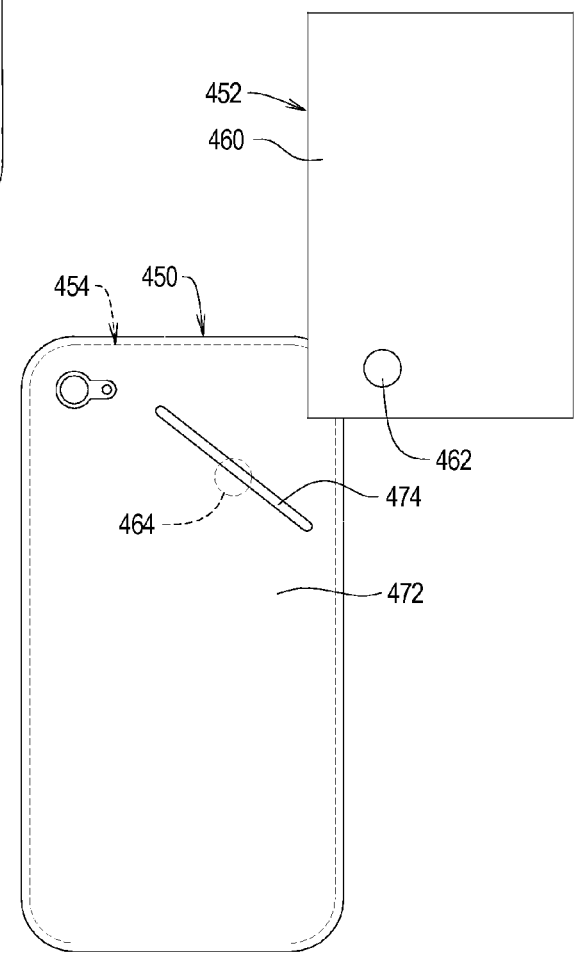
FIG. 8B is an exploded, rear elevation view of the first example case system and a support system as depicted in FIGS. 5A-5F.
Figure 8C:
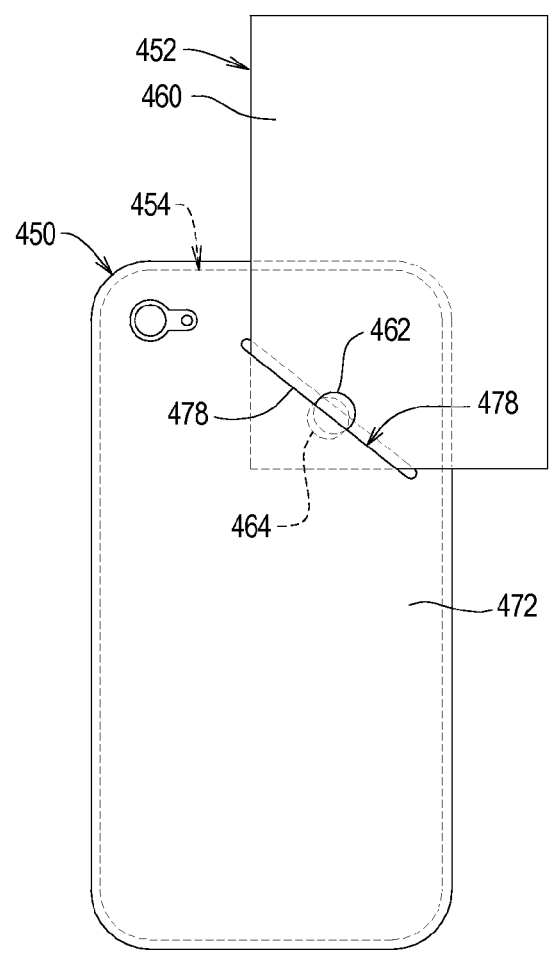
FIG. 8C is a rear elevation view depicting the first example case system securing the support system relative to a host device.

FIGS. 8A-8C illustrate a second example case system 450 capable of supporting an NFC support system 452 relative to a host device 454 to facilitate the transfer of data in a convenient manner. Like the example NFC support system 422 described above, the example NFC support system 452 comprises a substrate 460 and a NFC storage device 462 and may be formed, for example, by any of the example support systems 120, 220, 240, 260, and 280 described above. And like the example host device 424 described above, the example host device 454 is a smart phone comprising an NFC antenna 464.

As perhaps best shown in FIG. 8A, the example case system 450 comprises a case body or assembly 470 adapted to conform to the form factor of the host device 454. If the case system 450 comprises a unitary case body, the case body will typically be molded of a flexible material capable of being stretched over the host device so that the case body snugly fits over the host device 454. If the case system 450 comprises a two-part case assembly, the case body will typically be molded of two parts of rigid material capable of engaging each other to cover at least a substantial portion of the host device 454. Additionally, it is possible that the case body or assembly defines both an interior assembly of two rigid parts and a flexible body molded to fit over the two-part assembly.

Whether the case body or assembly 470 is formed of one piece, two pieces, or three pieces, the case body or assembly 470 defines an outermost rear wall 472. In the example case body 470 depicted in FIGS. 8A-8C, the rear wall 472 defines a clip slit 474. As shown in FIG. 8B, the clip slit 474 is arranged such that the slit 474 is adjacent to the NFC antenna 464 of the host device 454. And as shown in FIG. 8C, the clip slit 474 is sized and dimensioned to engage a portion of the substrate 460 as will be described in further detail below. Although the example case body 470 employs a clip slit 474, a separate wall and clip chamber similar to that defined by the clip system 420 may be used instead to obviate the need to pierce the envelope defined by the case body or assembly that is designed to be, for example, waterproof.

As generally described above, the example clip slit 474 is sized and dimensioned to engage the corner of the substrate 460 such that the NFC storage device 462 is arranged substantially adjacent to the NFC antenna 464 of the host device 454. The onboard antenna of the NFC storage device 462 will thus be held, without interaction with by the user, adjacent to the NFC antenna 464 of the host device 454. The user may thus use the host device 454 with two hands in a normal manner while data is transferred between the host device 454 and the NFC storage device 462.

Accordingly, when designing the case system 450 for the host device 454, the case designer should first identify a location of the NFC antenna 464 and arrange the clip slit or clip chamber such that the slit or chamber properly orients the NFC storage device 462 relative to the NFC antenna 464. Further, the case designer will also typically orient the clip slit or chamber 478 such that the substrate 460 is unlikely to fall out of the clip chamber 478 during transfer of data between the NFC storage device 462 and the host device 454 when the host device 454 is held and used in a normal spatial orientation.

The present invention may thus be embodied in many forms other than those depicted and described herein. The scope of the present invention should be determined based on the claims appended hereto and not the foregoing detailed description.

We claim:

1. A data exchange system for a user to control the exchange of data with a host device comprising host memory, a host transceiver system, and a host antenna, comprising:
    a device memory module for storing data;
    a device transceiver system comprising a device transceiver module and a device antenna, where the transceiver system allows the transfer of data between the device memory module and the host memory using the device antenna, the host antenna, and the host transceiver system;
    a power manager;
    a first switch operable by the user in a first state and a second state; and
    a power supply for providing power to the device memory module, the device transceiver, and the power manager; whereby
    when the first switch is in its first state, the device memory module and the device transceiver do not consume sufficient power from the power supply to allow the transfer of data between the device memory module and the host memory; and
    when the first switch is in its second state, the device memory and the device transceiver consume sufficient power from the power supply to allow the transfer of data between the device memory module and the host memory using the host transceiver system.

2. A data exchange system as recited in claim 1, further comprising a second switch operable by the user in a first state and a second state, wherein:
    when the second switch is in its first state, the device transceiver module is disconnected from the device antenna; and
    when the second switch is in its second state, the device transceiver module is connected to the device antenna.

3. A data exchange system as recited in claim 1, in which the first and second switches are operably connected such that:
    when the first switch is in its first state, the second switch is in its first state; and
    when the first switch is in its second state, the second switch is in its second state.

4. A data exchange system as recited in claim 1, in which the host device is one of a cell phone device and a computing device.

5. A data exchange system as recited in claim 1, further comprising:
    a housing for containing the device memory module, the device antenna, the device transceiver module, the power manager module, the first switch, and the power supply; and
    a substrate adapted to support the housing.

6. A data exchange system as recited in claim 5, in which the substrate further comprises:
- an active system; and
  - a communication system for allowing communication between the active system and the device memory module.

7. A data exchange system as recited in claim 6, in which the active system is at least one of a transceiver system, a sensor system, and a power supply system.

8. A data exchange system as recited in claim 6, in which the communication system comprises at least one pair of electrical contacts.

9. A data exchange system as recited in claim 6, in which the communication system comprises a substrate transceiver system for communicating with the device transceiver system.

10. A data exchange system as recited in claim 1, further comprising a clip system for supporting the device antenna in a desired orientation relative to the host antenna.

11. A data exchange system as recited in claim 10, in which the clip system comprises adhesive for securing the clip system relative to the host device.

12. A data exchange system as recited in claim 10, in which the clip system is integrally formed in a case for the host device.

13. A data exchange system as recited in claim 1, further comprising a clip system for supporting the substrate such that the device antenna is arranged in a desired orientation relative to the host antenna.

14. A data exchange system as recited in claim 1, further comprising a substrate adapted to support the housing.

15. A method of allowing a user to control the exchange of data with a host device comprising host memory, a host transceiver system, and a host antenna, comprising the steps of:
- providing a device memory module for storing data;
- providing a device transceiver system comprising a device transceiver module and a device antenna, where the device transceiver system allows the transfer of data between the device memory module and the host memory using the device antenna, the host antenna, and the host transceiver system
- mounting the device memory module, the device antenna, the device transceiver, a first switch, and a power supply within a housing;
- arranging the housing such that the host antenna and the device antenna are coupled;
- allowing the user to operate the first switch is in its first state such that the device memory module and the device transceiver do not consume sufficient power from the power supply to allow the transfer of data between the device memory module and the host memory; and
- allowing the user to operate the second switch is in its second state such that the device memory and the device transceiver consume sufficient power from the power supply to allow the transfer of data between the device memory module and the host memory using the host transceiver system.

16. A method as recited in claim 14, further comprising the steps of:
- providing a second switch operable in a first state and a second state;
- allowing the user to operate the second switch is in its first state to disconnect the device transceiver module from the device antenna; and
- allowing the user to operate the second switch is in its second state to connect the device transceiver module to the device antenna.

17. A method as recited in claim 16, further comprising the step of operably connecting the first and second switches such that:
- when the first switch is in its first state, the second switch is in its first state; and
- when the first switch is in its second state, the second switch is in its second state.

18. A data exchange system for allowing a user to control the exchange of data with a host device comprising host memory, a host transceiver system, and a host antenna, comprising:
- a device memory module for storing data;
- a device transceiver system comprising a device transceiver module and a device antenna, where the transceiver system allows the transfer of data between the device memory module and the host memory using the device antenna, the host antenna, and the host transceiver system;
- a power manager;
- a first switch operable by the user in a first state and a second state;
- a power supply for providing power to the device memory module, the device transceiver, and the power manager; and
- a housing for containing the device memory module, the device antenna, the device transceiver module, the power manager module, the first switch, and the power supply; whereby
- when the first switch is in its first state, the power manager operates in a first mode in which the device memory module and the device transceiver do not consume sufficient power from the power supply to allow the transfer of data between the device memory module and the host memory; and
- when the first switch is in its second state, the power manager operates in a second mode in which the device memory and the device transceiver consume sufficient power from the power supply to allow the transfer of data between the device memory module and the host memory using the host transceiver system.

19. A data exchange system as recited in claim 18, further comprising a second switch operable by the user in a first state and a second state, wherein:
- when the second switch is in its first state, the device transceiver module is disconnected from the device antenna; and
- when the second switch is in its second state, the device transceiver module is connected to the device antenna.

20. A data exchange system as recited in claim 18, in which the first and second switches are operably connected such that:
- when the first switch is in its first state, the second switch is in its first state; and
- when the first switch is in its second state, the second switch is in its second state.

* * * * *